Sept. 8, 1959  J. H. WEBSTER  2,903,322
VEHICLE MAXIMUM SPEED INDICATOR
Filed Feb. 20, 1953
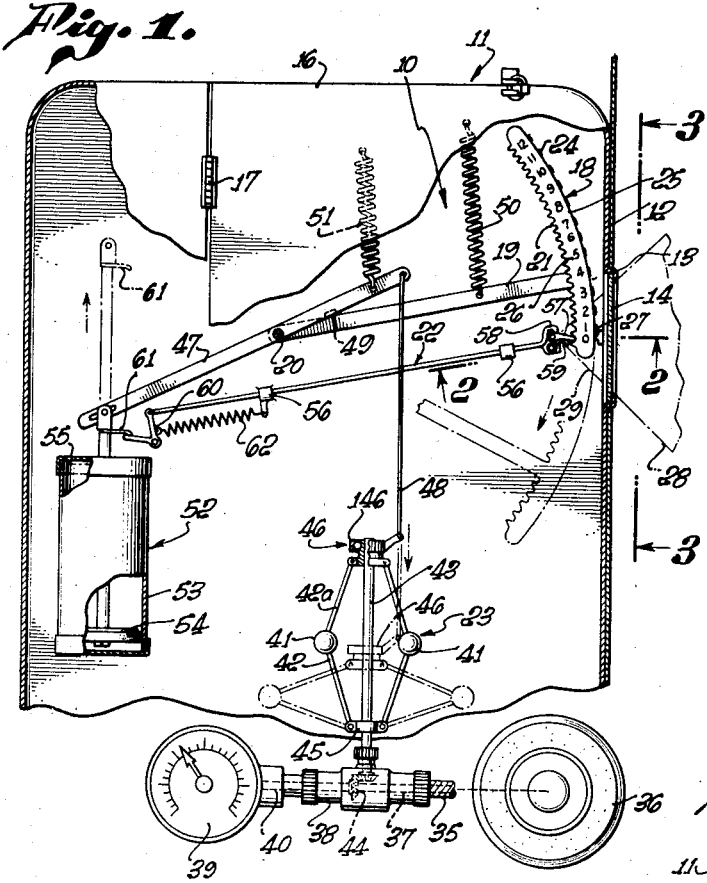
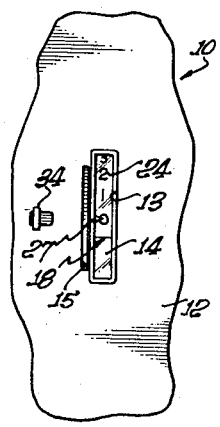
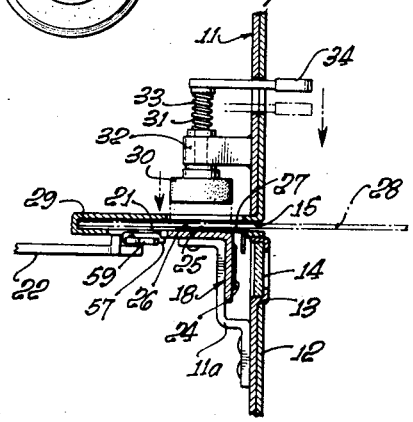
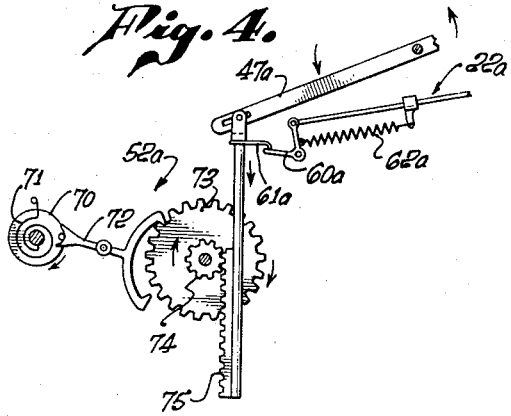
JOSEPH H. WEBSTER,
INVENTOR.
BY [signature]
ATTORNEY.

United States Patent Office 2,903,322
Patented Sept. 8, 1959

2,903,322

VEHICLE MAXIMUM SPEED INDICATOR

Joseph H. Webster, Medford, Oreg.

Application February 20, 1953, Serial No. 338,065

1 Claim. (Cl. 346—18)

This invention relates to improved apparatus for indicating and preferably recording the maximum speed at which a motor vehicle has been traveling.

The general object of the present invention is to provide a device for aiding police officers in definitely proving that a motorist has been driving at an excessive speed. More specifically, a device constructed in accordance with the invention is operable to indicate after a vehicle has stopped the maximum speed at which the vehicle had been driven prior to its stopping. Preferably, the apparatus is so constructed that the police officer may at that time make a permanent record of the maximum speed travelled, for later presentation to a court. After the vehicle has been stopped for a period, the device is automatically released from its indicating or recording position, and is then ready to indicate the maximum speed attained on the next operation of the vehicle.

The recording portion of the apparatus may comprise means adapted to mark on a sheet of paper or other material an indication of the speed travelled. Preferably, these means include a movable element which is displaced in accordance with changes in vehicle speed, and which carries raised numerals adapted to make speed indicating imprints in a sheet of deformable material such as paper. The paper may be positioned opposite the numeral carrying element by insertion into a specially formed recording slot, and may then be pressed against the numerals by means of a movable presser member to form the desired record.

The indicating or recording element may be actuated by any suitable speed responsive unit, a desirable actuating mechanism being of the centrifugally actuated type used in mechanical governors. Return of the indicating element to zero speed condition is restrained by a time delay mechanism, such as a dash pot or escapement mechanism, which maintains the element against return to zero for a sufficient period to permit the making of a permanent record by a police officer. Preferably, the time delay mechanism acts to release a lock device, which retains the indicating element in actuated position until released.

The above and other features and objects of the present invention will be better understood from the following detailed description of the typical embodiments illustrated in the accompanying drawing, in which:

Fig. 1 is a side view, partially broken away, of a maximum speed recording unit embodying the invention;

Fig. 2 is a section taken on line 2—2 of Fig. 1;

Fig. 3 is a front view of the apparatus, taken on line 3—3 of Fig. 1; and

Fig. 4 is a fragmentary view of the time delay unit of a variational form of the invention.

Referring first to Fig. 1, the speed recording apparatus 10 of the invention is shown contained within a housing 11, which is mounted in an automobile or other motor vehicle within sight of the driver. More specifically, the housing may typically be mounted behind the dash 12 of the vehicle, and may be visible and accessible through an opening 13 in the dash. Housing 11 has sheet metal or other walls extending about and closing all sides of the housing, except at the location of opening 13 in the dash. At that location, the housing has a transparent viewing window 14, and a vertically elongated slot 15 through which a sheet of paper may be partially inserted into the device. One of the side walls of the housing 11 preferably takes the form of a door 16, typically hinged to the housing at 17, and adapted to be swung to an open position in which the inner mechanism of the device is accessible for repair or replacement. Door 16 is preferably retained closed by a lead seal, which is not to be broken except by police or other authorities.

The inner mechanism of the device includes a vertically elongated indicator and recording element 18, which is carried and mounted by a swinging arm 19 for swinging movement about a shaft 20. Element 18 preferably extends arcuately about its axis of swinging movement, and at its forward side has a vertical series of ratchet teeth 21, engageable by a locking element 22. Upon increases in speed of the vehcile, element 18 is actuated downwardly by a speed responsive unit 23, and is retained by lock element 22 in a position corresponding to the maximum speed attained by the vehicle.

The indicator and recording element 18 has at its forward side a series of markings 24, which are visible to the driver through window 14, and which indicate the maximum vehicle speed. A lateral face 25 of element 18 carries a number of raised markings 26 which also indicate vehicle speed, and which are utilized for impressing a permanent record of the maximum vehicle speed onto a sheet of paper. A reference marker 27 is stationarily fastened to the housing, and has portions indicating the reading on scales 24 and 26 for any particular setting of element 18. More specifically, a forward portion of reference marker 27 is positioned for viewing with scale 24 through window 14, while a side portion of marker 27 is received alongside lateral face 25 of element 18, and is positioned to impress a reference indication on a sheet of paper 28 as the paper is pressed against raised markings 26.

Behind slot 15, I provide sheet metal 29, which is shaped to form a narrow recess, typically having the illustrated configuration of a right triangle, into which a corner portion of paper 28 is insertible. At one side, this sheet metal is broken away sufficiently to expose paper 28 to recording face 25 of element 18. At its opposite side, a more restricted area of the sheet metal is broken away, so that a presser element 30 may be moved laterally against the paper, to press the paper against recording face 25 at the location of reference marker 27. Presser element 30 is preferably formed of a resiliently deformable material, such as rubber, and by its lateral movement against paper 28 acts to form on the paper impressions of reference marker 27 and some of the raised markings 26 on element 18. Presser element 30 may typically be carried by a rigid shaft 31, which is mounted by bearing 32 for axial movement toward and away from element 18, and is yieldingly urged away from element 18 by spring 33. Shaft 31 and the carried presser element are actuable against element 18 by a manually actuated handle 34 which projects through an opening in housing 11 to a position which is accessible to the driver. A sheet metal backing element 11a, attached to housing 11, is provided at the side of element 18 opposite the side at which presser 30 is located, to back element 18 against movement during stamping of a paper 28 by the presser.

The speed responsive unit 23 within housing 11 is driven by the usual speedometer actuating flexible rotary power transmitting connection 35, which is diagrammatically illustrated as driven by a wheel 36 of the vehicle.

The power transmitting connection 35 is attached to and actuates a shaft 37 within a fitting 38 in the housing 11. Shaft 37 in turn drives the usual speedometer 39 through a connection 40.

Speed responsive unit 23 may typically be of the illustrated centrifugally actuated type normally used in mechanical governors, including a number of circularly spaced rotating weights 41 pivotally attached to swinging arms 42 and 42a. These weights and arms are carried by and rotate with a vertical shaft 43, which is rotatably driven by shaft 37 through bevel gears 44. At their lower ends, the lower arms 42 are pivotally attached to a collar 45, which is attached in fixed relation to shaft 43. The upper ends of the upper arms 42a are pivotally attached to an axially movable collar 46. As will be understood, an increase in the speed of rotation of shaft 43, resulting from an increase in speed of the vehicle, causes weights 41 to swing radially outwardly against the tendency of spring 51, to move upper collar 46 downwardly along shaft 43.

Vertical movement of collar 46 upon change in vehicle speed is utilized to swing a lever 47, through an axially movable connecting link 48, which is pivotally connected at its opposite ends to lever 47 and a nonrotating sleeve 146 carried by collar 46. This lever 47 is preferably mounted for swinging movement about the same shaft 20 which mounts arm 19. Lever 47 has a laterally projecting ear 49, which extends across the upper side of arm 19, to transmit clockwise swinging movement from lever 47 to arm 19, while permitting counter-clockwise swinging movement of the former independently of the latter. Arm 19 and lever 47 are independently urged in a counter-clockwise direction by a pair of individual coil springs 50 and 51, anchored at their upper ends to the housing.

Upon a decrease in speed of the vehicle, the resulting counter-clockwise swinging movement of lever 47 is retarded or slowed by a time delay dash pot unit 52, including a cylinder 53 and vertically movable piston 54. As will be understood, such counter-clockwise swinging of lever 47 can be effected only as fast as air can flow into cylinder 53 through an upper restricted inlet opening 55. Opening 55 is sufficiently small as to require a substantial length of time for lever 47 to return to its zero speed position from an actuated position. Preferably, the return of lever 47 from a 60 miles per hour position should take between about 1 and 2 minutes. Lock element 22 comprises an elongated rod which is mounted for axial movement by a pair of bushings 56 attached to the housing. At its rear end, this element pivotally carries a swinging pawl 57, which is engageable with ratchet teeth 21 of element 18 in the illustrated position of element 22. Upward swinging movement of pawl 57 beyond its Fig. 1 position is prevented by a pawl engaging ear 58 of element 22, while downward swinging movement of the pawl is yieldingly resisted by a spring 59. Pawl 57, in its position of engagement with element 18, is thus downwardly deflectible to permit downward or speed increasing advancement of element 18, while preventing upward movement of that element. Element 18 is therefore retained in a downwardly actuated position until release of lock element 22 by forward or leftward movement as seen in Fig. 1. The lock element is retracted in this forward direction by counterclockwise swinging movement of a pivotally mounted bell crank 60, one of whose arms is pivotally attached to the left end of element 22, and the other of whose arms is engageable and deflectible by a lug 61 of piston unit 54 upon return of the piston unit to its zero speed position. Lock element 22 and crank 60 are yieldingly urged toward their active locking positions by a coil spring 62, whose ends are anchored to crank 60 and one of the bushings 56 respectively.

In driving a vehicle equipped with the apparatus of Figs. 1 to 3, increases in the speed of the vehicle and wheel 36 cause an increase in the speed of rotation of shaft 43 of the speed responsive unit 23. This causes weights 41 to move outwardly and pull collar 46 downwardly, in a manner swinging lever 47 in a clockwise direction. This swinging movement is transmitted by ear 49 to arm 19, which carries and moves downwardly the indicating element 18. The speed increase is indicated to the driver by the positioning of markings 24 on element 18 relative to reference marker 27. Upon a subsequent decrease in speed, pawl 57 retains element 18 in a position corresponding to the maximum speed attained while lever 47 and the speed responsive unit 23 return to reduced speed positions. If the vehicle is stopped, lever 47 and speed responsive unit 23 return to their Fig. 1 zero speed positions, after a delay period introduced by the resistance of dash pot 52. During the delay period, a police officer may insert the corner of a sheet of paper 28 into slot 15, and then actuate handle 34 laterally in a manner pressing the paper against raised markings 26 and reference marker 27, to impress on the paper a permanent record of the maximum speed which had been attained by the vehicle prior to stopping. As the delay period ends, lug 61 carried by piston unit 52 actuates bell crank 60 to retract lock element 22 and its pawl 57, and thus release indicator element 18 for upward movement to its zero speed position.

Fig. 4 illustrates fragmentarily a variational form of the invention, which is identical with that of Figs. 1 to 3 except that a different type of time delay unit is substituted for the unit 52 of the first form. Specifically, the Fig. 4 arrangement employs a mechanical escapement mechanism diagrammatically represented at 52a, which acts to delay or slow the counter-clockwise swinging movement of a lever 47a corresponding to the lever 47 of Fig. 1. When escapement mechanism 52a reaches its zero speed position, lug 61a actuates bell crank 60a in a manner retracting lock element 22a against the tendency of spring 62a. The escapement mechanism 52a is typically and diagrammatically represented as comprising a rotatably oscillating balance wheel 70 and its spring 71, a pivotally oscillating member 72, and a toothed gear 73 whose movement is controlled by the oscillations of member 72. Gear 73 carries a smaller gear 74, which engages a rack 75, to introduce a time delay in downward return of the rack following a reduction in vehicle speed.

The invention is not to be considered as limited to the specific structures described above, but includes broadly all equivalents of those structures. For example, while the invention has been described as applied to a vehicle, certain aspects of the invention may of course be applicable to other mechanisms whose maximum speeds of operation it may be desirable to record. When applied to a vehicle, it is believed that this device will tend to deter the operator from exceeding legal speeds, and will thereby reduce accidents.

I claim:

Apparatus comprising a movable element, speed responsive means operable by changes in the speed of said vehicle to actuate said element to positions representing different speeds thereof, a first swinging arm movably mounting said element, a second swinging arm actuated by said speed responsive means and adapted to actuate said first arm in an increasing speed direction but movable independently of the first arm in a decreasing speed direction, a releasable ratchet pawl permitting movement of said element in an increasing speed direction but operable to prevent movement of the element in a down speed direction, said pawl acting after said vehicle has slowed from one speed to another to temporarily retain said element in a position representing the maximum speed at which the vehicle has been traveling, and time delay means acting to release said ratchet and permit return of said element from said maximum speed position following a delay period after slowing of the vehicle, said speed responsive means comprising a rotary centrifugally actuated unit, said time delay means comprising a dash pot unit retarding movement of said second arm in a decreasing speed direction, and said apparatus including raised speed indicating markings on said movable element, and a presser element adapted to press a sheet of paper against said markings to record said maximum speed attained.

References Cited in the file of this patent

UNITED STATES PATENTS

| | | |
|---|---|---|
| 585,726 | Walsh | July 6, 1897 |
| 890,100 | Shedlock | June 9, 1908 |
| 917,893 | Purdy | Apr. 13, 1909 |
| 1,028,220 | Jones | June 4, 1912 |
| 1,443,040 | Rebori | Jan. 23, 1923 |
| 1,448,043 | Tillander | Mar. 13, 1923 |
| 1,812,576 | Wray et al. | June 30, 1931 |
| 1,899,956 | Greenley | Mar. 7, 1933 |
| 2,149,478 | Triner | Mar. 7, 1939 |
| 2,152,800 | Gresham | Apr. 4, 1939 |
| 2,156,085 | Dardani | Apr. 25, 1939 |
| 2,253,419 | Cunningham | Aug. 19, 1941 |
| 2,336,076 | Durham et al. | Dec. 7, 1943 |
| 2,338,590 | Komusin | Jan. 4, 1944 |
| 2,614,239 | Smith et al. | Oct. 14, 1952 |
| 2,778,707 | Webster | Jan. 22, 1957 |